United States Patent
McCormick et al.

(10) Patent No.: US 8,080,807 B2
(45) Date of Patent: Dec. 20, 2011

(54) USING UV LIGHT SOURCE FOR SELF TESTING GAS FILLED GAMMA AND NEUTRON DETECTORS

(75) Inventors: Dan Jay McCormick, Hudson, OH (US); Frederick L. Glesius, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 12/564,404

(22) Filed: Sep. 22, 2009

(65) Prior Publication Data

US 2011/0068274 A1    Mar. 24, 2011

(51) Int. Cl.
  *G01T 3/00*    (2006.01)
(52) U.S. Cl. .......... 250/390.01; 250/374; 250/375; 250/378; 250/389
(58) Field of Classification Search .......... 250/374, 250/375, 382, 252.1, 390.01
See application file for complete search history.

(56) References Cited

U.S. PATENT DOCUMENTS

| 6,313,638 | B1* | 11/2001 | Sun et al. | 324/464 |
| 6,426,504 | B1* | 7/2002 | Menlove et al. | 250/390.01 |
| 7,368,707 | B2* | 5/2008 | Croydon | 250/252.1 |

* cited by examiner

*Primary Examiner* — David Porta
*Assistant Examiner* — Hugh H Maupin
(74) *Attorney, Agent, or Firm* — Pearne & Gordon LLP

(57) ABSTRACT

An apparatus for detecting at least one of neutron and gamma ray reception and outputting a signal indicative of the reception. A detector is responsive to the at least one of neutron and gamma ray reception. The detector has a cathode, an anode separated by a space from the cathode, and a gas within the separating space. Charge is generated within the gas upon the at least one of neutron and gamma ray reception at the cathode and the charge passes to the anode as a detection. A processing arrangement is operatively connected to the anode for outputting the signal indicative of the detection. A light irradiation arrangement for introducing a light irradiation causes charge within the gas that replicates the charge generated upon detection and that causes output of a signal that replicates the signal indicative of the detection.

12 Claims, 4 Drawing Sheets

USING UV LIGHT SOURCE FOR SELF TESTING GAS FILLED GAMMA AND NEUTRON DETECTORS

BACKGROUND OF THE INVENTION

1. Field of the Invention

The invention relates to gamma and neutron detector arrangements, and specifically relates to gamma and neutron detector arrangements that can be tested to determine operability.

2. Discussion of Prior Art

Recently, high-sensitivity detectors, such as neutron detectors, for homeland security have become increasingly important and increasingly in demand. There are many known types of neutron detectors. Some examples utilize He-3 or B-10 as neutron sensitive material within the detector. Also, gamma detectors, utilized alone or in combination with neutron detectors, have become increasingly important and increasingly in demand.

Accurate operation of a neutron/gamma detector apparatus is always desired. Specifically for a neutron detector, upon neutron impingement, the neutron detector should provide a signal indicative of the neutron impingement. Similarly for a gamma detector, upon gamma ray impingement, the gamma detector should provide a signal indicative of the gamma ray impingement. Components, such as electronics, of the neutron/gamma detector apparatus should accurately operate to provide the indicative signal. Accurate operation can be verified via testing.

A new generation of neutron/gamma detector apparatuses would be most beneficial if the new generation had improved ability for testing.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides an apparatus for detecting at least one of neutron and gamma ray reception and outputting a signal indicative of the at least one of neutron and gamma ray reception. The apparatus includes a detector responsive to the reception of the at least one of neutron and gamma ray at the detector. The detector has a cathode for receiving the at least one of neutron and gamma ray, an anode separated by a space from the cathode, and a gas within the separating space. Charge is generated within the gas upon the cathode receiving the at least one of neutron and gamma ray and the charge passing to the anode as a detection. The apparatus includes a processing arrangement operatively connected to the anode for outputting the signal indicative of detection of the at least one of neutron and gamma ray reception. The apparatus includes a light irradiation arrangement for introducing a light irradiation that causes charge within the gas that replicates the charge generated upon the at least one of neutron and gamma ray reception and that causes output of a signal that replicates the signal indicative of detection of the at least one of neutron and gamma ray reception.

Another aspect of the invention provides an apparatus for detecting at least one of neutron and gamma ray reception and outputting a signal indicative of the at least one of neutron and gamma ray reception. The apparatus includes a detector responsive to the reception of the at least one of neutron and gamma ray at the detector. The detector has a cathode for receiving the at least one of neutron and gamma ray, an anode separated by a space from the cathode, and a gas within the separating space. Charge is generated within the gas upon the cathode receiving the at least one of neutron and gamma ray and the charge passing to the anode as a detection. The apparatus includes means operatively connected to the anode for processing information indicative of the detection of the at least one of neutron and gamma ray reception and outputting the signal indicative of the detection of the at least one of neutron and gamma ray reception. The apparatus includes means for introducing a light irradiation that causes charge within the gas that replicates the charge generated upon the at least one of neutron and gamma ray reception and that causes output of a signal that replicates the signal indicative of detection of the at least one of neutron and gamma ray reception.

Another aspect of the invention provides an apparatus that includes a detector that contains gas responsive to reception of the at least one of neutron and gamma ray at the detector. The detector produces a signal indicative of the reception of the at least one of neutron and gamma ray. The apparatus includes an irradiation source to react with the gas in the detector to produce a test signal that simulates the signal indicative of the reception of the at least one of neutron and gamma ray.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
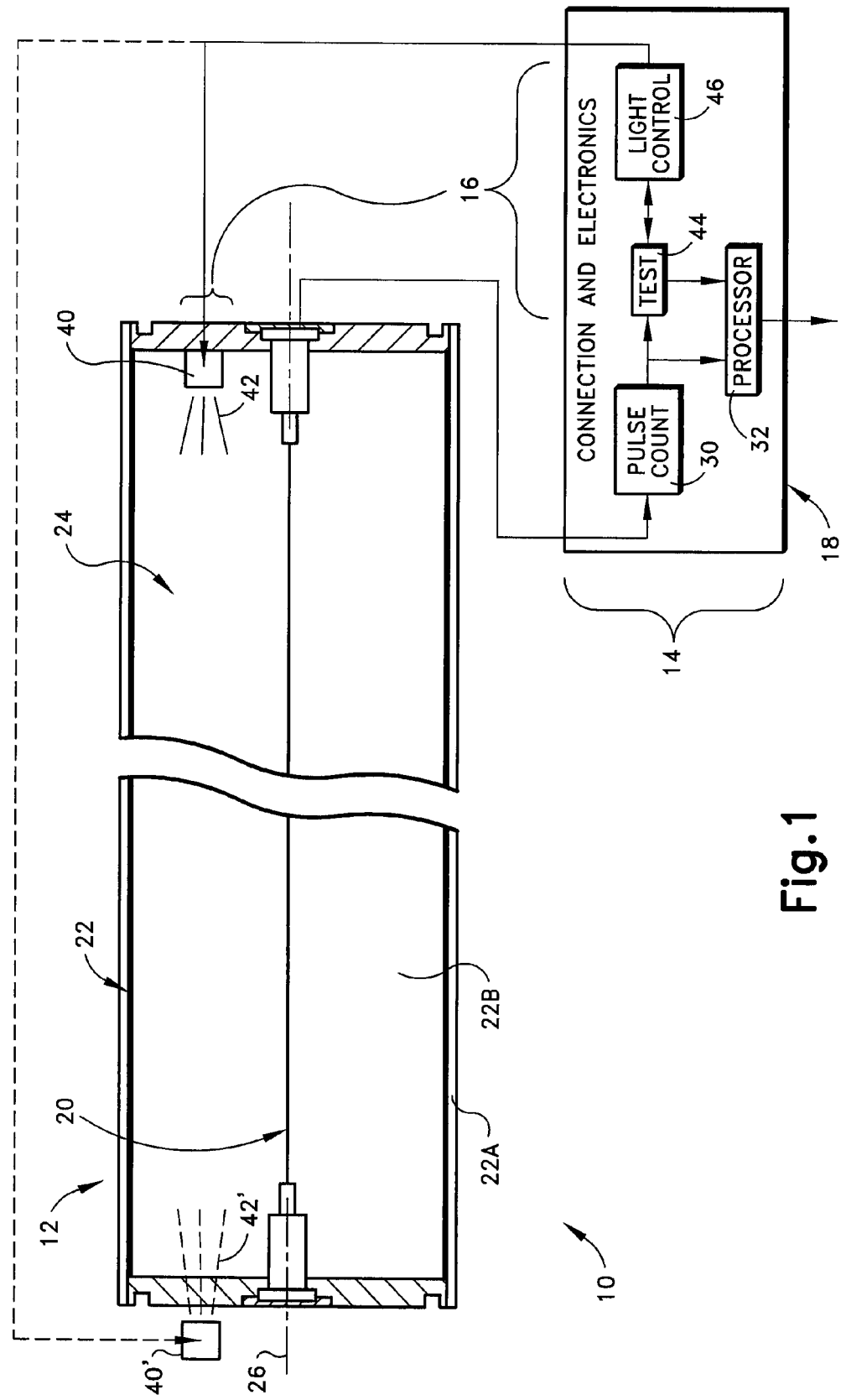
FIG. 1 is a schematic illustration of a first example apparatus in accordance with one aspect of the present invention and includes an example neutron detector, shown in cross-section, and associated an example arrangement for testing.

Example embodiments that incorporate one or more aspects of the invention are described and illustrated in the drawings. These illustrated examples are not intended to be limitations on the invention. For example, one or more aspects of the invention can be utilized in other embodiments and even other types of devices. Moreover, certain terminology is used herein for convenience only and is not to be taken as a limitation on the invention.

An example embodiment of an apparatus 10 that includes an aspect of the invention is schematically shown in FIG. 1. The shown example apparatus 10 includes a neutron detector 12. Other examples may include detector(s) for detecting gamma rays or a combination of neutrons and gamma rays. Some further examples as such are presented later herein.

Basically, the neutron detector apparatus 10 includes the neutron detector 12, associated components (e.g., circuitry) within an arrangement 14 for processing the events of reception of neutron particles and outputting a signal indicative thereof, and components within an arrangement 16 for testing operation of the neutron detector/processing components. The arrangement 14 can be considered to be a processing arrangement. In one example, some or all of the arrangement 14 for processing the events of reception and the arrangement 16 for testing operation may be combined together in a connections and electronics package 18. As such, the arrangement 14 is an example of means for processing information indicative of the detection of at least neutron reception. Also, it is to be appreciated that the arrangement 14 for processing the events of reception and the arrangement 16 for testing operation may share some aspects/components and/or may include processing of functional steps within one or more components. Such combined aspects may be considered to be an output arrangement. It is to be clearly appreciated that the shown embodiment is merely an example and is shown schematically. Thus, it is to be understood that variation/change from the shown example is certainly contemplated within the invention.

Focusing upon the neutron detector 12, the detector basically includes a pair of electrodes, which are an anode 20 and a cathode 22. The anode 20 and cathode 22 are separated from each other by a volume 24. In the shown example the cathode 22 provides part of the outer boundary of the volume 24. The volume 24 is sealed and contains a gas, such as argon with an additive of carbon-dioxide.

The anode 20 is electrically conductive. In the shown example, the anode 20 is elongate and extends along an axis 26 of the neutron detector 12 and the cathode 22 is cylindrical and extends around the anode 20 and the axis 26. In one example, the anode 20 is a wire that is in the range of 0.0254-0.0508 mm (0.001-0.002 inches) in diameter. As should be appreciated, such shape and size features are merely for the example. Accordingly, such features of the example should not be considered to be limitations upon the invention.

The cathode 22 includes a supporting substrate 22A and a layer 22B of a neutron sensitive material on the substrate. In one specific example, the neutron sensitive material is a boron material that is enriched to have a high content of B-10. However, it is to be clear that other neutron sensitive materials could be used. The layer 22B of the cathode 22 faces (i.e., is exposed to) the anode 20. As such, the layer 22B is an interior face of the cathode 22 which contains the neutron sensitive material (e.g., boron, B-10). Another way of presenting this is that the cathode 22 has an interior face that includes the boron. For the sake of providing an explanation of typical neutron detector operation, the example, with the boron, B-10 is discussed. However, the person of ordinary skill in the art will appreciate the similar operation(s) that will occur if other detector features, neutron sensitive materials, etc. are employed.

Within the example, sensing a neutron is accomplished by a current pulse that occurs between the anode 20 and cathode 22, through the gas, when a neutron impinges upon the B-10 boron of the cathode. When a neutron is absorbed by a B-10 atom in the layer 22B on the cathode 22, an alpha particle (i.e., a helium-4 nucleus) and lithium-7 nucleus—both positively charged—are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume 24, it ionizes the gas. The negative ion particles, electrons, drift towards the anode 20 and as the negatively charged particles approach sufficiently near the anode (e.g., within 1-3 anode diameters) the negatively charged particles accelerate to the point of generating even more charge. This is called "gas gain" and it generates enough charge so that the resulting current has a perceptible effect within the arrangement 14 for processing the events of reception operatively connected to the neutron detector 12. Thus, the current at the anode 20 is detectable and quantifiable.

The anode 20 is electrically connected to the arrangement 14 for processing the events of reception. The arrangement 14 includes one or more components (e.g., detection electronics) as will be appreciated by the person of skill in the art. In the shown example, the arrangement 14 for processing the events of reception includes a pulse count function block 30 operatively connected to the output of the anode 20 and a processor 32 operatively connected to the pulse count function block 30. In turn, the processor 32 provides an output that can be indicative of the neutron reception. It is to be appreciated that in one example, the pulse count function block 30 may include an electronic amplifier in order to aid in processing the current generated at the anode 20. As such, the arrangement 14, with its pulse count function block 30 operatively connected to the anode and its processor 32 providing an output, is an example of means operatively connected to the anode for processing information indicative of the detection of at least neutron reception and outputting the signal indicative of the detection of the neutron reception.

In general, each neutron detection causes a signal pulse. The pulse count function block 30 is provided to count pulses as an indication of the number received neutrons. Thus, pulse count is proportional to neutron activity. Such information is passed to the processor 32, as needed, and a signal indicative of the neutron incidence is output. It is to be appreciated that general operation/structure of neutron detectors and associated electronics arrangements for detecting/quantifying neutron activity will be appreciated by the person of skill in the art.

In the shown example, the arrangement 16 for testing operation include a light irradiation arrangement 40 for introducing a light irradiation 42 that causes the apparatus 10, and specifically the neutron detector 12 and the arrangement 14 for processing the events of reception, to respond similarly to the reception of neutrons and to output a signal similar to the signal indicative of the neutron reception. Thus, the light irradiation arrangement 40 is an example of means for introducing a light irradiation that causes charge within the gas that replicates the charge generated upon at least neutron reception and that causes output of a signal that replicates the signal indicative of detection of the at least one of neutron and gamma ray reception. In the shown example, the light irradiation arrangement 40 is provided as a light source 40 located within the neutron detector 12. Such a configuration could be considered to be self-contained. However, it is possible to position the light source at another location. In one example, such other location would be next to the neutron detector. To represent such other possible light source positions, a second light source 40' is shown via phantom-dash lines. The light source 40 outputs the light 42 that is incident upon the gas. The neutron detector would be configured to be transparent/translucent to the light appropriate to permit the light to be incident upon the gas.

The gas within the volume 24 includes at least one component that can be ionized by light irradiation. The light 42 from the light source 40 includes at least one component that causes ionization of the gas. When the gas is ionized, the charge within the gas can proceed to the anode 20 in a similar manner as charge introduced to the gas from neutron absorption at the cathode 22. Thus, the charge caused by the light ionizing the gas replicates the charge caused by neutron impingement upon the cathode 22 that is detected. As such, as the negatively charged particles approach sufficiently near the anode (e.g., within 1-3 anode diameters) the negatively charged particles accelerate to the point of generating even more charge based upon the "gas gain" and it generates enough charge so that the resulting current has a perceptible effect, as if the charge was caused by the neutron reception. Thus, a current pulse will be generated and detected/counted at the pulse count function block 30. As such, the current pulse replicates the current pulse from neutron detection. The replication can be considered to be a simulation.

In one example, the light source 40 is an LED. As mentioned, the light source ionized the gas. The specific light (e.g., frequency, intensity, etc) is to be match with one or more components of the gas to cause the ionization. For example, if the gas contains Argon as a component, then a light that contains a frequency in the deep blue range, or possibly even beyond the deep blue range, would be useful to cause the ionization of the Argon.

Turning to other components of the arrangement 16 for testing operation, the shown example includes a test control function block 44 and a light control function block 46. It is to be appreciated that the function blocks 44, 46 may be provided as components or the functions may be provided within a combined overall component/processor. For efficiency in discussion, these aspects (function blocks/components) are further referred herein to by merely the function. The test control 44 is operatively connected to the pulse count 30, the processor 32 and the light control 46. However, it is to be appreciated that a different arrangement of operative connection may be used.

The test control 44 controls operation of the light control 46 so that the light is only energized to emit light during a test. It is to be appreciated that neutrons will impinge upon the detector 12 even during a test. Thus pulses will occur from both the neutron impingement and the light irradiation, with the pulses from the light irradiation replicating pulses from the neutron impingement. In one example, the test control 44 and processor 32 utilize historical data to differentiate (e.g. subtraction of an established benchmark associated with light irradiation) the two sources of pulses (i.e., actual neutron impingement and light irradiation). Thus, the test control 44 provides one example of means for differentiating signals from testing. Specifically, the test control provides one example of means for differentiating between signals indicative of detection of the at least one of neutron and gamma ray reception and signals from test signals caused by the light irradiation.

The control of the light source 40 can be such to achieve any desired irradiation pattern/timing/duration. In one example, the light may be pulsed ON for one microsecond ($10^{-6}$) for each pulse. Also, in one example, the light may be pulsed ON 100-200 times per second. Still further in one example, the duration of an ON/OFF sequence may be for one minute. Thus, the light irradiation provides a replication of the effect caused by the neutron impingement, but which is readily controlled so as to be useful to provide test results.

Often multiple detectors are used within a single arrangement. An arrangement for testing operation may be included in some or all detectors. It is contemplated that some sharing/combining of functions/components may be utilized within an overall arrangement for testing operation of multiple detectors.

Figure 2:
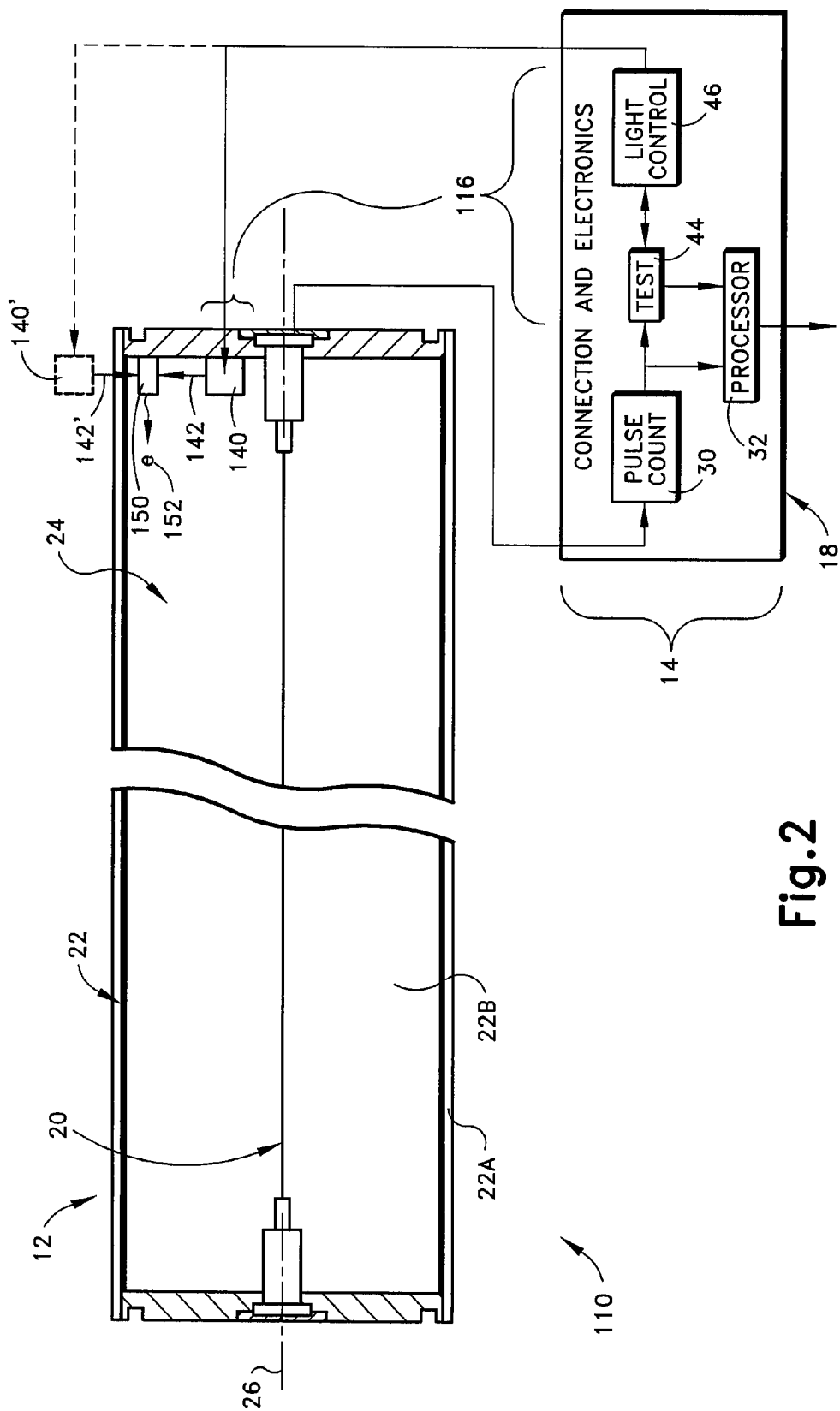
FIG. 2 is a second example apparatus in accordance with another aspect of the present invention and includes another example neutron detector, shown in cross-section, and another example arrangement for testing.

It is to be appreciated that other arrangements/methodologies for testing are contemplated. FIG. 2 shows an apparatus 110 that has a different arrangement 116 for testing operation of the neutron detector/processing components. For purposes of this discussion features that are, or are essentially, identical to their counterparts within the previously discussed example of FIG. 1 are identified with identical reference numbers, and are not discussed in detail. Also, counterparts provide additional examples of means providing for specific functions.

In the shown example, the arrangement 116 for testing operation includes a light irradiation arrangement 140 for introducing a light irradiation 142 that causes the apparatus 110, and specifically the neutron detector 12 and the arrangement 14 for processing the events of reception, to respond similarly to the reception of neutrons and to output a signal similar to the signal indicative of the neutron reception. Also, the arrangement 116 for testing operation includes a photo-responsive charge-emitter 150 that emits charges 152 in response to reception of the light irradiation 142 from the light irradiation arrangement 140. In the shown example, the light irradiation arrangement 140 is provided as a light source 140 and the photo-responsive charge-emitter 150 is a photocathode 150. Both the light source 140 and the photocathode 150 are located within the neutron detector 12, and such a configuration could be considered to be self-contained. However, it is possible to position the light source at another location. In one example, such other location would be next to the neutron detector. To represent such other possible light source positions, a second light source 140' is shown via phantom-dash lines. The light source 140 (and/or 140') outputs light 142 (or 142') that is incident upon the photocathode 150.

The charge 152 from the photocathode 150 causes ionization of the gas. When the gas is ionized, the charge within the gas can proceed to the anode 20 in a similar manner as charge introduced to the gas from neutron absorption at the cathode 22. In other words, the charge caused by the photocathode replicates the charge caused by neutron incidence. As such, when the negatively charged particles approach sufficiently near the anode (e.g., within 1-3 anode diameters) the negatively charged particles accelerate to the point of generating even more charge based upon the "gas gain" and it generates enough charge so that the resulting current has a perceptible effect, as if the charge was caused by the neutron reception. Thus, a current pulse will be generated and detected/counted at the pulse count function 30. Again, the current pulse replicates the pulse from neutron detection. The replication can be considered to be a simulation. The operation is thus similar to the operation described in connection with the example of FIG. 1.

As mentioned other types of detectors may also be provided with an arrangement for testing operation. Also as mentioned, such a detector may be a gamma detector.

Figure 3:
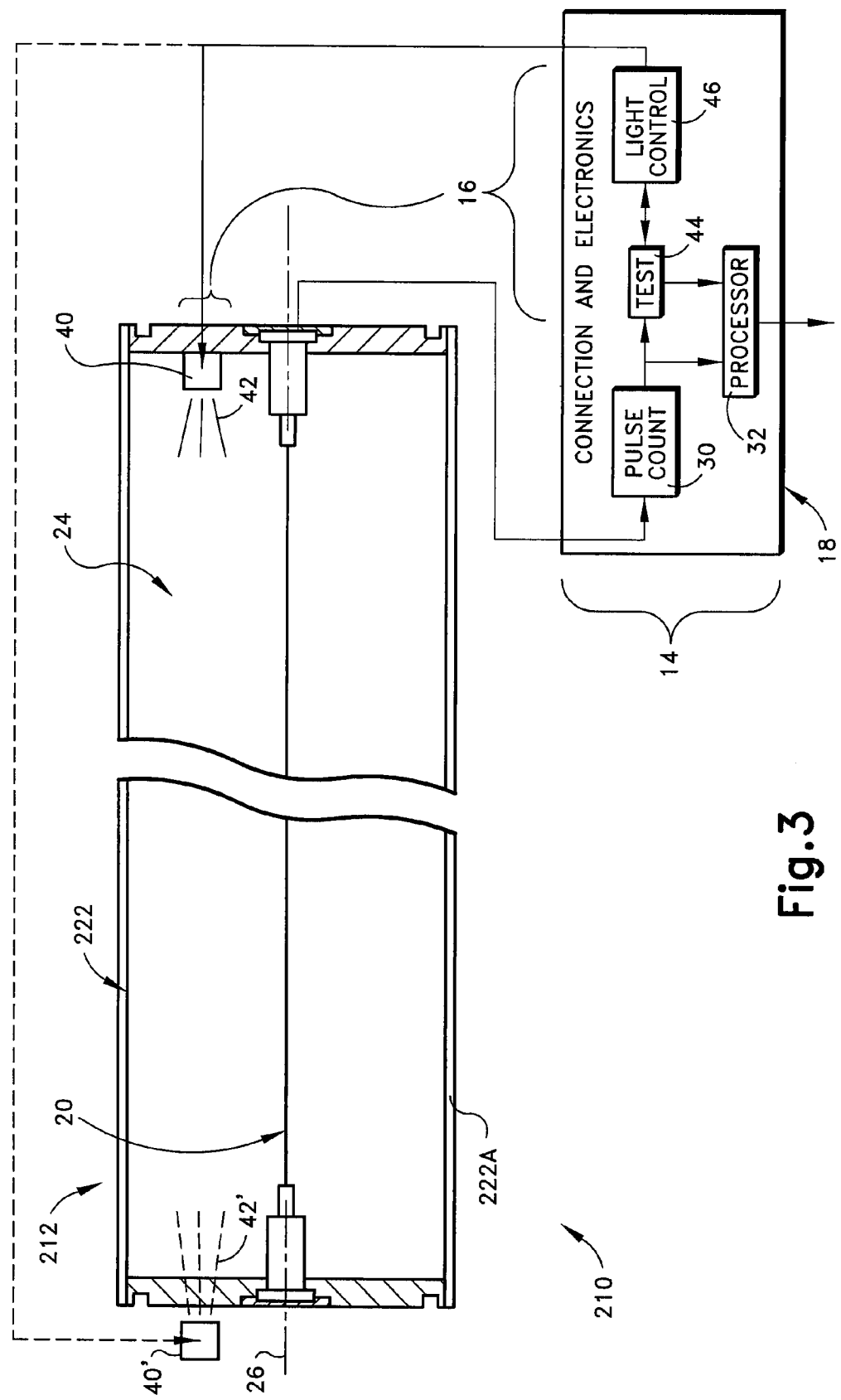
FIG. 3 is a third example apparatus in accordance with another aspect of the present invention and includes an example gamma detector, shown in cross-section, and an example arrangement for testing.

FIG. 3 shows an apparatus 210 that includes a gamma detector 212 instead of a neutron detector. Except for this difference, many of the features are, or are essentially, identical to their counterparts within the previously discussed example of FIG. 1, are identified with identical reference numbers, and are not discussed in detail. The shown example gamma detector 212 does not include a neutron sensitive material as part of the cathode 222. As such, the cathode 222 is merely provided as the substrate material 222A.

Similar of the previous examples, light from the light source 40 will causes the apparatus 210, and specifically the gamma detector 212 and the arrangement 14 for processing the events of reception, to respond similarly to the reception of gamma rays and to output a signal similar to the signal indicative of the reception. In a specific similarity to the example of FIG. 1, light from the light source 40 will cause the gas to be ionized, and the charge within the gas can proceed to the anode 20 in a similar manner. The charge is a replication of charge caused by Gamma ray incidence. Thus, a current pulse will be generated and detected/counted at the pulse count function 30. The current pulse is a replication of a pulse caused by gamma ray detection. The replication can be considered to be a simulation. The operation is thus similar to the operation described in connection with the example of FIG. 1.

Figure 4:
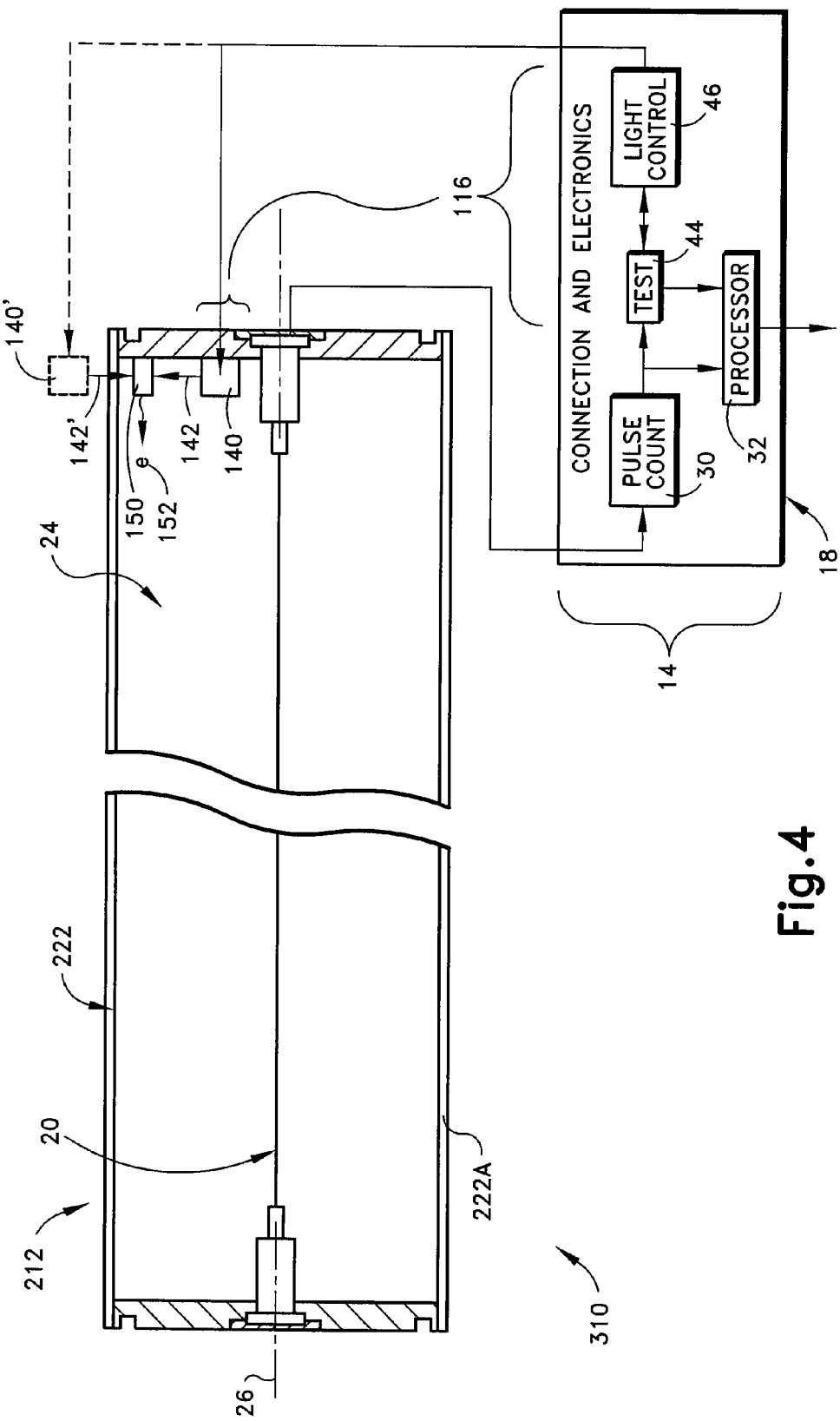
FIG. 4 is a fourth example apparatus in accordance with another aspect of the present invention and includes another example gamma detector, shown in cross-section, and another example arrangement for testing.

FIG. 4 shows an apparatus 310 that includes a gamma detector 212 that is, or is essentially, the same as the gamma detector of the example of FIG. 3. Also, the apparatus includes an arrangement 116 for testing operation of the detector/processing components that is, or is essentially, the same as the detector of the example of FIG. 2.

Similar of the previous examples, light from the light source 140 will causes the apparatus 310, and specifically the gamma detector 212 and the arrangement 14 for processing the events of reception, to respond similarly to the reception of gamma rays and to output a signal similar to the signal indicative of the reception. Similar to the example of FIG. 2, the charge 152 from the photocathode 150 causes ionization of the gas. With the gas is ionized, the charge within the gas can proceed to the anode 20. Thus, the charge is a replication of charge caused by Gamma ray incidence. As such, as the negatively charged particles approach sufficiently near the anode (e.g., within 1-3 anode diameters) the negatively charged particles accelerate to the point of generating even more charge based upon the "gas gain" and it generates enough charge so that the resulting current has a perceptible effect. Thus, a current pulse will be generated and detected/counted at the pulse count function 30. The current pulse is a replication of a pulse caused by gamma ray detection. The replication can be considered to be a simulation.

Thus, the above discussed provide examples of an apparatus for detecting at least one of neutron and gamma ray reception and outputting a signal indicative of the at least one of neutron and gamma ray reception. The apparatus includes a detector responsive to the reception of the at least one of neutron and gamma ray at the detector, the detector having a cathode for receiving the at least one of neutron and gamma ray, an anode separated by a space from the cathode, and a gas within the separating space, charge being generated within the gas upon the cathode receiving the at least one of neutron and gamma ray and the charge passing to the anode as a detection. The apparatus includes a processing arrangement operatively connected to the anode for outputting the signal indicative of detection of the at least one of neutron and gamma ray reception. The apparatus includes a light irradiation arrangement for introducing a light irradiation that causes charge within the gas that replicates the charge generated upon the at least one of neutron and gamma ray reception and that causes output of a signal that replicates the signal indicative of detection of the at least one of neutron and gamma ray reception.

Also, the above discussed provide examples of an apparatus that includes a detector that contains gas responsive to reception of the at least one of neutron and gamma ray at the detector. The detector produces a signal indicative of the reception of the at least one of neutron and gamma ray. The apparatus includes an irradiation source to react with the gas in the detector to produce a test signal that simulates the signal indicative of the reception of the at least one of neutron and gamma ray.

The arrangement 14 for processing the events of reception of neutron particles and outputting a signal indicative thereof provides one example of means operatively connected to the anode for processing information indicative of the detection of the at least one of neutron and gamma ray reception and outputting the signal indicative of the detection of the at least one of neutron and gamma ray reception. The arrangement (e.g., 16/116) for testing operation of the neutron detector/processing components provides an example of means for introducing a light irradiation that causes charge within the gas that replicates the charge generated upon the at least one of neutron and gamma ray reception and that causes output of a signal that replicates the signal indicative of detection of the at least one of neutron and gamma ray reception. The test control provides one example of means for differentiating signals from testing. Specifically, the test control provides one example of means for differentiating between signals indicative of detection of the at least one of neutron and gamma ray reception and signals from test signals caused by the light irradiation.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. An apparatus for detecting at least one of neutron and gamma ray reception and outputting a signal indicative of the at least one of neutron and gamma ray reception, the apparatus including:
    a detector responsive to the reception of the at least one of neutron and gamma ray at the detector, the detector having a cathode for receiving the at least one of neutron and gamma ray, an anode separated by a space from the cathode, and a gas within the separating space, charge being generated within the gas upon the cathode receiving the at least one of neutron and gamma ray and the charge passing to the anode as a detection, the gas within the separating space includes at least one component that can be ionized by light irradiation;
    a processing arrangement operatively connected to the anode for outputting the signal indicative of detection of the at least one of neutron and gamma ray reception; and
    a light irradiation arrangement for introducing a light irradiation that causes the at least one component within the gas to be ionized by the light irradiation and in turn causes charge within the gas that replicates the charge generated upon the at least one of neutron and gamma ray reception and that causes output of a test signal that replicates the signal indicative of detection of the at least one of neutron and gamma ray reception.

2. An apparatus as set forth within claim 1, wherein the detector is responsive to neutron reception at the detector.

3. An apparatus as set forth within claim 1, wherein the detector is responsive to gamma ray reception at the detector.

4. An apparatus as set forth within claim 1, wherein the light irradiation arrangement includes at least one light source located within the detector.

5. An apparatus as set forth within claim 1, wherein the light irradiation arrangement includes at least one light source located adjacent to the detector.

6. An apparatus as set forth within claim 1, wherein the light irradiation arrangement includes a light source for outputting the light irradiation and a photocathode for emitting charge upon reception of the light irradiation from the light emitting member, the light emitting member being operatively configured to direct the light irradiation onto the photocathode, and the photocathode being configured to provide the charge within the gas that replicates the charge generated upon the at least one of neutron and gamma ray reception.

7. An apparatus as set forth within claim 1, output arrangement includes means for differentiating between signals indicative of detection of the at least one of neutron and gamma ray reception and signals from test signals caused by the light irradiation.

8. An apparatus as set forth within claim 6, wherein the light source is located within the detector.

9. An apparatus as set forth within claim 6, wherein the light source is located adjacent to the detector.

10. An apparatus as set forth within claim 6, wherein the photocathode is located within the detector.

11. An apparatus for detecting at least one of neutron and gamma ray reception and outputting a signal indicative of the at least one of neutron and gamma ray reception, the apparatus including:

a detector responsive to the reception of the at least one of neutron and gamma ray at the detector, the detector having a cathode for receiving the at least one of neutron and gamma ray, an anode separated by a space from the cathode, and a gas within the separating space, charge being generated within the gas upon the cathode receiving the at least one of neutron and gamma ray and the charge passing to the anode as a detection, the gas within the separating space includes at least one component that can be ionized by light irradiation;

means operatively connected to the anode for processing information indicative of the detection of the at least one of neutron and gamma ray reception and outputting the signal indicative of the detection of the at least one of neutron and gamma ray reception; and means for introducing a light irradiation that causes the at least one component within the gas to be ionized by the light irradiation and in turn causes charge within the gas that replicates the charge generated upon the at least one of neutron and gamma ray reception and that causes output of a signal that replicates the signal indicative of detection of the at least one of neutron and gamma ray reception.

12. An apparatus including:

a detector containing gas responsive to reception of the at least one of neutron and gamma ray at the detector, the detector producing a signal indicative of the reception of the at least one of neutron and gamma ray; and an irradiation source to react with the gas in the detector to produce a test signal that simulates the signal indicative of the reception of the at least one of neutron and gamma ray.

\* \* \* \* \*